(12) United States Patent
Vitalini

(10) Patent No.: US 10,858,199 B2
(45) Date of Patent: Dec. 8, 2020

(54) CONVEYING SYSTEM WITH SEGMENTS AND METHOD FOR TRANSPORTING INDIVIDUAL ITEMS

(71) Applicant: SIEMENS AKTIENGESELLSCHAFT, Munich (DE)

(72) Inventor: Michele Vitalini, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 184 days.

(21) Appl. No.: 15/686,395

(22) Filed: Aug. 25, 2017

(65) Prior Publication Data
US 2018/0057271 A1    Mar. 1, 2018

(30) Foreign Application Priority Data

Aug. 25, 2016 (EP) .................................. 16185726

(51) Int. Cl.
| | | |
|---|---|---|
| *B65G 43/10* | (2006.01) | |
| *B65G 15/22* | (2006.01) | |
| *B07C 1/04* | (2006.01) | |
| *B07C 1/06* | (2006.01) | |
| *B65G 47/244* | (2006.01) | |
| *B65G 47/31* | (2006.01) | |

(52) U.S. Cl.
CPC ................ *B65G 43/10* (2013.01); *B07C 1/04* (2013.01); *B07C 1/06* (2013.01); *B65G 15/22* (2013.01); *B65G 47/2445* (2013.01); *B65G 47/31* (2013.01); *B65G 2201/0285* (2013.01); *B65G 2203/0225* (2013.01); *B65G 2203/0233* (2013.01)

(58) Field of Classification Search
CPC ........ B65G 43/10; B65G 13/10; B65G 15/22; B65G 47/31; B65G 47/2445; B07C 1/04; B07C 1/06
USPC ......................................................... 198/401
See application file for complete search history.

(56) References Cited

U.S. PATENT DOCUMENTS

| | | |
|---|---|---|
| 7,233,840 B2 | 6/2007 | Schiesser et al. |
| 7,552,815 B2 | 6/2009 | Pahud |

(Continued)

FOREIGN PATENT DOCUMENTS

| | | |
|---|---|---|
| EP | 1666386 A1 | 6/2006 |
| WO | 2004039706 A1 | 5/2004 |

(Continued)

*Primary Examiner* — Gene O Crawford
*Assistant Examiner* — Lester Rushin, III
(74) *Attorney, Agent, or Firm* — Laurence Greenberg; Werner Stemer; Ralph Locher

(57) ABSTRACT

A conveying system transports items, such as postal items, along a main conveying direction. A conveying route includes segments that are arranged one behind the other along the main conveying direction. The segments have conveyors arranged parallel to one another and the segments are offset relative to one another in a transverse direction. The conveyors are driven and activated individually by a control unit. The items are conveyed along the main conveying direction by transferring an item from a preceding segment to a following segment that is offset relative to the preceding segment and then transporting the item on the following segment. Items with small dimensions, which rest on just one conveyor can also be manipulated during the transportation.

13 Claims, 3 Drawing Sheets

(56) References Cited

U.S. PATENT DOCUMENTS

| | | | | |
|---|---|---|---|---|
| 8,127,915 B2* | 3/2012 | Alleman | ................ | A21C 15/04 |
| | | | | 198/415 |
| 8,251,202 B2 | 8/2012 | Edelmann et al. | | |
| 2007/0246328 A1 | 10/2007 | Reznik | | |
| 2011/0147163 A1 | 6/2011 | Alleman et al. | | |
| 2013/0220775 A1 | 8/2013 | Faist et al. | | |
| 2017/0320676 A1* | 11/2017 | Boyce | .................... | B65G 13/07 |

FOREIGN PATENT DOCUMENTS

| | | |
|---|---|---|
| WO | 2006002156 A1 | 1/2006 |
| WO | 2008074453 A1 | 6/2008 |

* cited by examiner

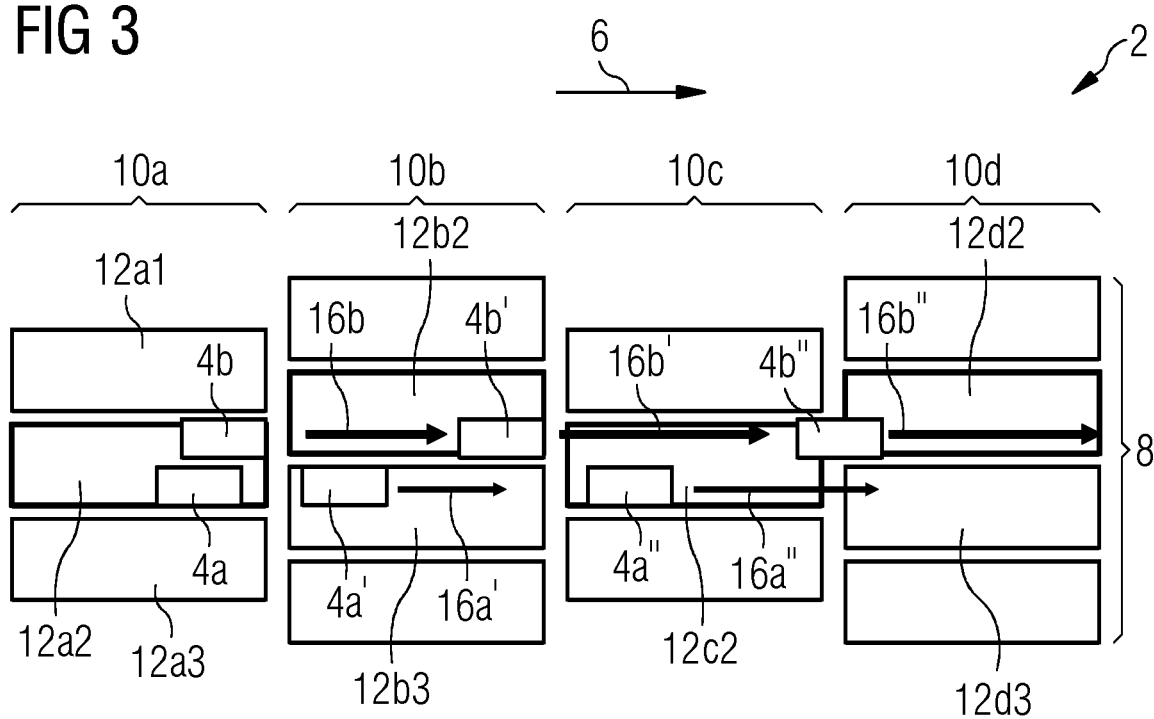
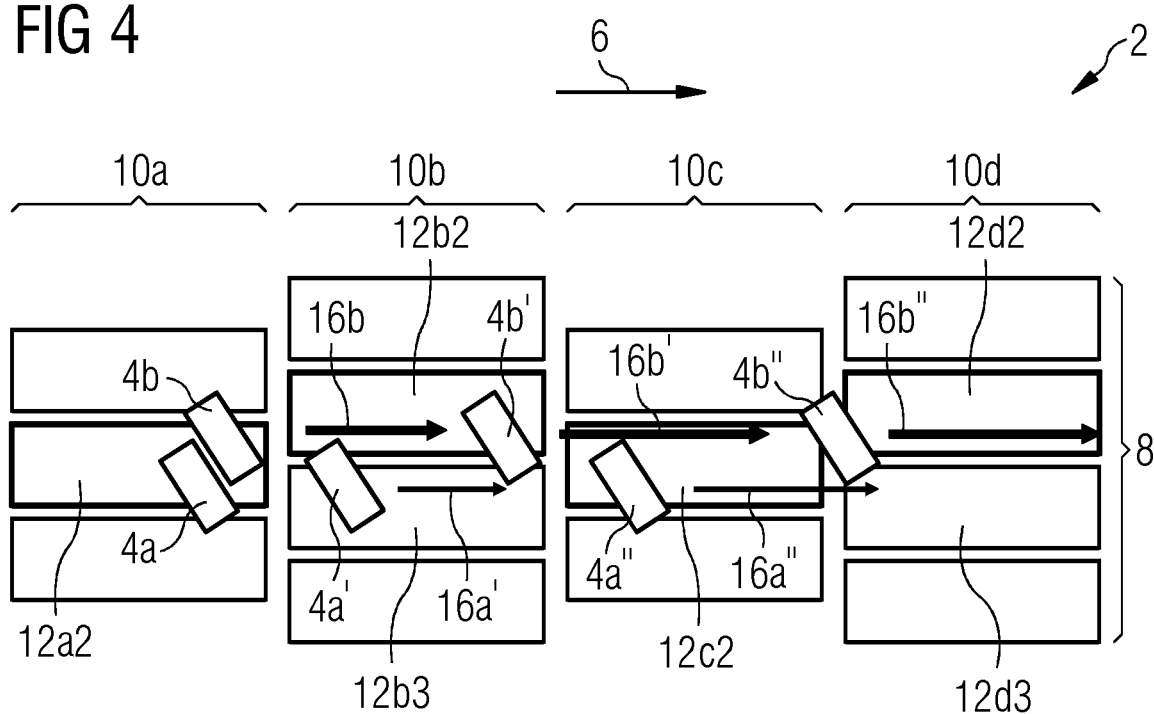

CONVEYING SYSTEM WITH SEGMENTS AND METHOD FOR TRANSPORTING INDIVIDUAL ITEMS

CROSS-REFERENCE TO RELATED APPLICATION

This application claims the benefit, under 35 U.S.C. § 119, of European patent application EP 16185726.3, filed Aug. 25, 2016; the prior application is herewith incorporated by reference in its entirety.

BACKGROUND OF THE INVENTION

Field of the Invention

The present invention relates to the technical field of a conveying system for items to be conveyed.

Items to be conveyed are transported on a conveying system along a conveying route, wherein the items to be conveyed which are transported along a main transport direction are manipulated, for instance separated and/or rotated, without using further apparatuses such as for instance deflecting plates among others, by the items to be conveyed being transported by way of more than one conveying means. Singulators which can moreover still partially align the items to be conveyed are used to separate items to be conveyed in the postal and logistics field. International patent application WO 2004/039706 describes a singulator with conveyor belts as conveying means which are arranged one behind the other and in parallel with one another and which transport items to be conveyed along a main conveying direction. The conveying means arranged at right angles to the main conveying direction and in parallel with one another form segments and the items to be conveyed are separated and/or rotated by activating the conveying means of a segment differently.

The foregoing and other typical singulators, however, are always designed for a specific size of items to be conveyed. A reliable separation can only be achieved if the item to be conveyed is larger than the width of the contact surface of the conveying means. However the market demands more and more the processing, alignment and separation of items to be conveyed and postal items with smaller dimensions. If two small items to be conveyed are resting in parallel adjacent to one another on a conveyor belt of the afore-described singulator, they are always transported further together and cannot be separated. Since the conveying means are arranged directly one behind the other and are aligned in a line, they always remain resting together when being transferred from a preceding to a following conveying means and cannot be transported individually by the conveying means, even when the conveying means are activated individually. The separation which does not take place as a result may finally result in an incorrect sorting. To reduce this problem, additional conveying means such as belts and conveyors are installed downstream of the singulator and attempts are thus made to separate the parallel postal items and to guide them back upstream of the singulator; this is associated with an additional space requirement.

SUMMARY OF THE INVENTION

It is accordingly an object of the invention to provide a conveying system which overcomes the above-mentioned and other disadvantages of the heretofore-known devices and methods of this general type and to provide for the transport of items, in particular also items to be conveyed with smaller dimensions, on a conveying system and in doing so to efficiently manipulate the same during their transport.

With the foregoing and other objects in view there is provided, in accordance with the invention, a conveying system for transporting items to be conveyed along a main conveying direction, the conveying system comprising:
  a control unit;
  a conveying route formed of a plurality of segments;
  the segments being arranged one behind another along the main conveying direction and the segments being offset relative to one another perpendicularly to the main conveying direction;
  each of the segments including a plurality of conveyors arranged substantially in parallel with one another and configured to transport the items to be conveyed along the main conveying direction; and
  the conveyors being connected to the control unit and individually driven and individually activated by the control unit.

The inventive solution provides a conveying system for transporting items to be conveyed, in particular postal items, along a main conveying direction, comprising a control unit and a conveying route. The conveying route comprises segments which are arranged one behind the other along the main conveying direction. The segments have conveyors, for instance conveyor belts—referred to as conveying means in the following—which are arranged substantially in parallel with one another and which are configured to transport the items to be conveyed along the main conveying direction. The conveying means can be driven individually and can be activated individually by the control unit. The segments are arranged offset in relation to one another at right angles to the main conveying direction.

According to a preferred embodiment, one segment can comprise one or more conveying means, which are configured to transport the items to be conveyed along the main conveying direction. One segment, which comprises only one conveying means, can transport two or more items to be conveyed, which are transferred in parallel at the same height by a preceding conveying means of a preceding segment, further along the main conveying direction, but cannot however change their relative position and alignment in relation to one another. If a segment comprises two or more conveying means, two items to be conveyed, which are transferred in parallel at the same height as a preceding segment, can be transferred on different conveying means of the following segment. As a result, these items to be conveyed can be transported at different speeds by the different conveying means and thus separated. However when just one item to be conveyed is transferred, this however rests on the following segment on two different conveying means, a change in the alignment can take place by activation at different speeds.

In order to achieve a displacement of the segments at right angles to the main conveying direction in a particularly simple manner, the segments can be arranged offset in relation to one another at right angles to the main conveying direction, by the conveying means of adjacent segments being arranged offset in relation to one another.

According to a preferred embodiment, a conveying means of a preceding segment can lead into two or more conveying means of a following segment. As a result, two or more items to be conveyed which rest together on the conveying means of the preceding segment can also be transferred particularly easily without changing direction onto individually activatable conveying means. In this way a displaced arrangement can also be achieved particularly easily with conveying means having substantially the same width.

In order to provide as uncomplicated a conveying system with similar components as possible, one or a number of segments can comprise similar conveying means. With similar conveying means, a similar activation can also take place; the design and maintenance require the same technical competence with all conveying means. This reduces the complexity of the conveying system.

According to a preferred embodiment, the conveying system can comprise at least one sensor, which is configured to detect the position and/or alignment of the items to be conveyed, and the control unit can be adapted in order to activate the conveying means in response to the detected position and/or alignment of the items to be conveyed. A particularly efficient activation of the conveying means which is individually adapted to the respective position and/or alignment of the items to be conveyed on the conveying system can thus take place and can thus manipulate the items to be conveyed particularly efficiently. In order to achieve a successful separation and/or change in alignment, this standard alignment of the items to be conveyed is initially not necessary.

In order to manipulate an item to be conveyed particularly efficiently, the control unit can be adapted in order to rotate and/or separate an item to be conveyed by controlling the conveying speed of the conveying means, in particular the conveying means on which the item to be conveyed is resting, and/or the conveying means which is directly adjacent thereto. The rotation and/or separation to be achieved can thus be calculated with a computing capacity which is adjusted to the complexity of the control unit, since all conveying means can, but need not, be included in the calculation. The calculation is carried out with particularly little complexity by only the conveying means on which the item to be conveyed is resting and/or the conveying means which is directly adjacent thereto being included in the calculation.

With the above and other objects in view there is also provided, in accordance with the invention, a method for transporting items to be conveyed, in particular postal items, on a conveying route of a conveying system. The conveying route comprises segments, which are arranged one behind the other along a main conveying direction. The segments comprise conveying means which are arranged substantially in parallel with one another, for instance conveyor belts, which are configured to transport the items to be conveyed along the main conveying direction. The conveying means can be driven individually and activated individually. The method comprises the method steps:
  a) transporting an item to be conveyed on a preceding segment;
  b) transferring an item to be conveyed along the main conveying direction from one preceding segment to a following segment which is arranged offset in relation to this preceding segment; and
  c) transporting the item to be conveyed on the following segment.

In order to achieve a flexible embodiment of the conveying system in accordance with a preferred embodiment, one segment can comprise one or more conveying means, which are configured to transport the items to be conveyed along the main conveying direction. Therefore the segments arranged one behind the other can be designed to be very flexible in terms of the width and arrangement of their conveying means.

In order to achieve a displacement of the following segment in relation to the preceding segment in a particularly uncomplicated manner, the following segment can be arranged offset in relation to the preceding segment, by the conveying means of the following segment being arranged offset in relation to the conveying means of the preceding segment. Furthermore, a displacement can also be achieved particularly easily in the case of conveying means with different widths.

According to a preferred embodiment, a conveying means of the preceding segment can lead into two or more conveying means of the following segment. Therefore, one or a number of items to be conveyed of the preceding segment, which initially rest on the one conveying means of the preceding segment, can be transferred singly on two or more conveying means of the following segment by movement in the main conveying direction and are individually further transported and thus separated and/or rotated by individually activating this conveying means. When arranging the conveying means of the preceding and the following segment in one line, the one or the number of items to be conveyed must to this end still additionally be moved at right angles to the main conveying direction; this would require conveying means of a more complex design and moreover a more complicated activation.

According to a preferred embodiment, the conveying means of adjacent segments can be arranged such that an item to be conveyed is transferred from one conveying means of the preceding segment to two conveying means of the following segment. The one item to be conveyed can thus be transported and manipulated by the two conveying means of the following segment, in particular in respect of its alignment. Furthermore, after the transfer this arrangement enables a particularly simple separation of two items to be conveyed which are arranged in parallel on the conveying means of the preceding segment.

In order to achieve a manipulation of the items to be conveyed on the conveying system in a more targeted and efficient manner, the position and/or alignment of the items to be conveyed on the conveying system can be detected and the conveying means can be activated in response to the detected position and/or alignment of the items to be conveyed.

To enable a particularly efficient activation of the conveying means, the rotation and/or separation of the items to be conveyed can take place by controlling the conveying speed of the conveying means, in particular the conveying means on which the items to be conveyed rest, and/or the directly adjacent conveying means. The fewer conveying means consulted for the control process, the less complicated and clearer are the calculation and implementation of the method.

To enable the separation of the items to be conveyed, in particular small items to be conveyed, in a particularly simple manner, the transfer from a preceding segment to a following segment can involve two or more conveying means. If the item to be conveyed has such small dimensions that it rests centrally on just one conveying means of the preceding segment, this ensures that it is thus transferred onto one or more conveying means of the following segment. With a sufficiently displaced arrangement, in the case of just one conveying means the item to be conveyed now no longer rests centrally on the conveying means of the following segment and can now be manipulated; when being transferred onto two or more conveying means of the following segment, the item to be conveyed which now rests on more than one conveying means can be manipulated by individually driving these two or more conveying means.

Other features which are considered as characteristic for the invention are set forth in the appended claims.

Although the invention is illustrated and described herein as embodied in a conveying system with segments, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3 shows a separation process of two items to be conveyed which are initially aligned together, as in FIG. 2, approximately in parallel to the main conveying direction and rest together on one conveying means;

FIG. 4 shows a separation process of two items to be conveyed, which initially rest together with their center of gravity on just one conveying means of the conveying system in FIG. 3.

DETAILED DESCRIPTION OF THE INVENTION

Figure 1:
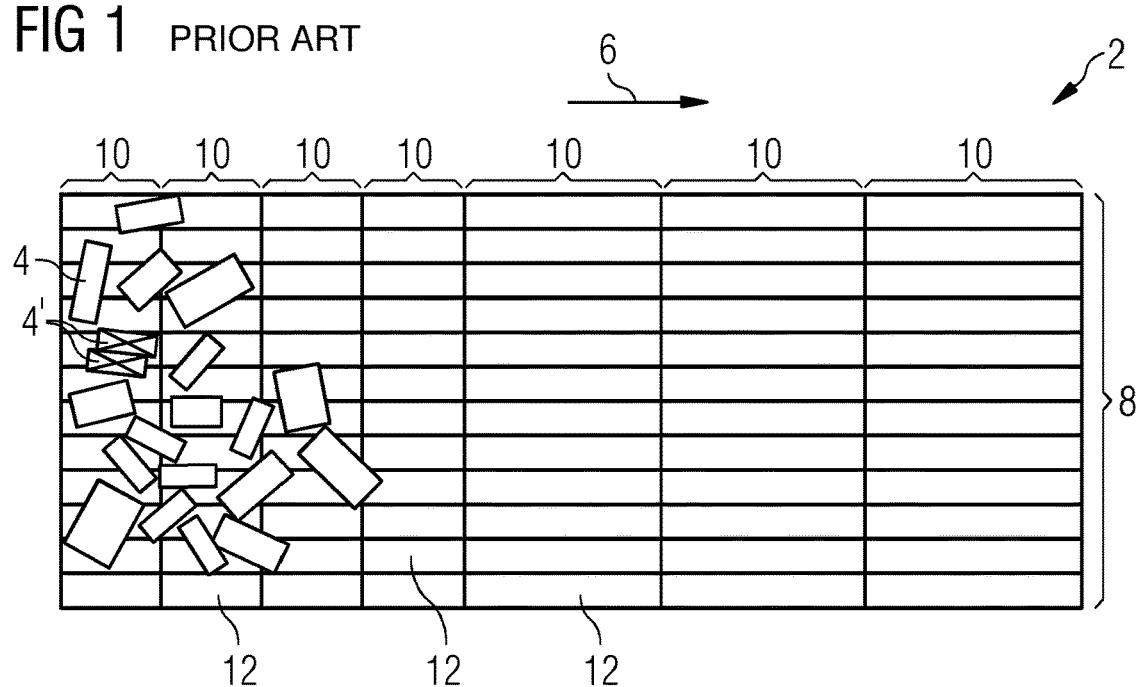
FIG. 1 is a schematic plan view onto a conveying system with segments configured according to the prior art.

Referring now to the figures of the drawing in detail and first, particularly, to FIG. 1 thereof, there is shown a conveying system 2 according to the prior art, which transports items to be conveyed 4, which rest on conveyors 12, or conveying means 12, along a main conveying direction 6 on a conveying route 8. The conveying means 12 are arranged in parallel to the main conveying direction 6 in segments 10 arranged one behind the other along the main conveying direction 6, in true alignment and along a line. A conveying system 2 of this type is optimized for transporting and manipulating items to be conveyed 4 of one size, which corresponds to the contact surface of a conveying means 12. Typical fields of application of a conveying system 2 of this type are singulators in the postal and logistics field. The items to be conveyed 4, here postal items, are transferred for transportation from one segment 10 to the respective following segment 10. Large items to be conveyed 4 rest on one or a number of conveying means 12 at the same time and can therefore be separated and rotated when the conveying means 12 are activated individually by a control unit 14 (cf. FIG. 2) during their transport, for instance by the conveying means 12, on which the relevant item to be conveyed 4 rests, being operated at a higher conveying speed 16 than the adjacent conveying means 12. As can be seen however, two smaller items to be conveyed 4', marked with crosses in the drawing, rest together on a conveying means 12. The embodiment of the conveying system 2 with conveying means 12 arranged in a line along the main conveying direction 6 does not enable the two smaller items to be conveyed 4' to be influenced solely by activating the conveying means 12, since these items to be conveyed 4' are also always transferred together from one conveying means 12 of a preceding segment 10 to a conveying means 12 of a following segment 10. The conveying means 12 transport the items to be conveyed 4 along the main conveying direction 6. The two smaller items to be conveyed 4' cannot be transferred on two or more different conveying means 12 solely by transport along the main conveying direction 6.

Figure 2:
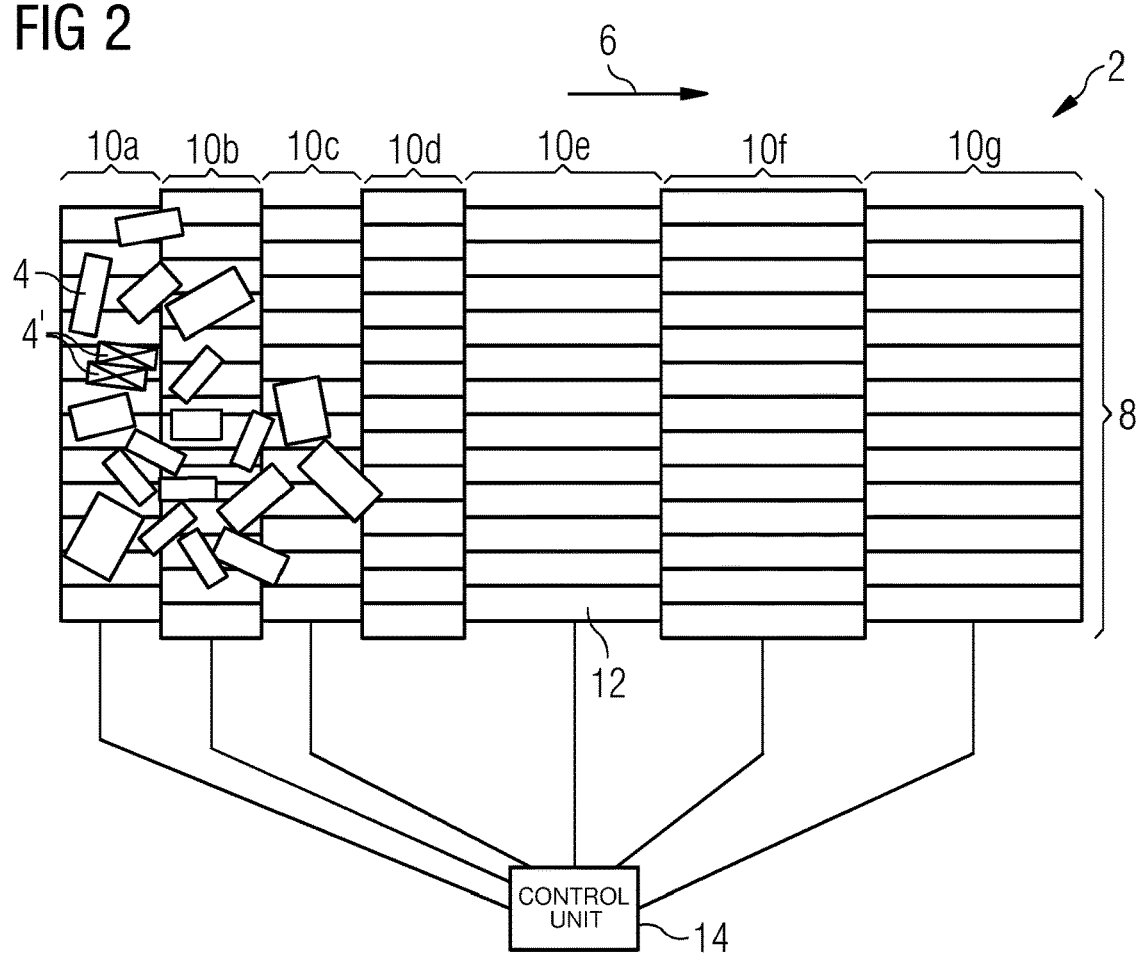
FIG. 2 is a schematic view of a conveying system according to the invention with segments arranged alternately offset.

FIG. 2 shows a conveying system 2 with segments 10a-10g arranged alternately offset perpendicularly to the main conveying direction 6 according to a preferred embodiment of the invention. The arrangement of the items to be conveyed 4 corresponds to that in FIG. 1 and the two smaller items to be conveyed 4' rest together on the first segment 10a likewise on just one conveying means 12 so that it is not possible to separate the smaller items to be conveyed 4' using the conveying system 2 shown in FIG. 1. On account of the offset arrangement of the conveying means 12 of the adjacent segments 10a, 10b, the two smaller items to be conveyed 4', which initially rest entirely together on one conveying means 12, can be transferred by solely transporting the same along the main conveying direction onto two different, individually driveable and activatable conveying means 12 of the following segment 10b. All conveying means 12 are connected to a control unit 14, so that on account of different conveying speeds of the two different conveying means 12 of the following segment 10b, the two smaller items to be conveyed 4' can be separated. One segment 10 extends in each case across almost the entire width of the conveying route 8.

The segments 10a-10g shown in this conveying system 2 are arranged regularly alternately offset. It is possible to manipulate the items to be conveyed 4 at different locations on the conveying route 8 by connecting in series a plurality of segments 10a-10g which are arranged offset with one another. The conveying means 12 are configured as conveyor belts which offer the advantage of a relatively large and flat contact surface, can moreover be realized in a technically simple manner and are therefore widened conveying means 12, but other embodiments, for instance transport rollers, transport marbles etc. are also possible. It is also conceivable to simultaneously use differently configured conveying means 12, in one segment 10 or in adjacent segments, depending on the area of application. In order to transport and manipulate items to be conveyed 4 of different sizes on an inventive conveying system 2, only one arrangement of two or more segments 10 which is offset in any manner is possible, so that a conveying means 12 of a preceding segment 10 leads into two or more conveying means 12 of a subsequent segment 10. An offset arrangement can be achieved particularly easily, by some or all conveying means 12 of adjacent segments 10a, 10b being arranged offset in relation to one another. It is also possible however that a first segment 10a, which comprises a number of conveying means 12, leads into a segment 10b, which only comprises one conveying means 12 which spans the entire width of the conveying route 8 and only the segment 10c which follows the segment 10b is arranged offset in relation to the first segment 10a.

The conveying system 2 shown in FIG. 2 comprises segments 10a-10g with conveyor belts as similar conveying means 12, which each have the same width but a different length. To achieve a greater separation effect, in further embodiments one or a number of segments 10 can also be used with one or a number of conveying means 12 of a different width, so that a conveying means 12 of a preceding segment 10 leads into three or more conveying means 12 of a following segment 10. With an offset arrangement, some or all conveying means 12 of different segments 10 are not arranged in one line. An item to be conveyed 4 which initially rests singly on a conveying means 12 of a segment 10 will thus rest on two or more conveying means 12 of a segment 10 which follows on in the main conveying direction 6 when being transported on the conveying system 2 along the main conveying direction 6. A similar embodiment of the conveying means 12 is in most cases associated with less complexity in terms of technical realization, wherein the similar embodiment of the conveying means 12 in particular describes the type of the conveying means 12, a different width and/or length of the conveying means 12 and a different number of conveying means 12 of a different segment 10 is also included in the term "similar conveying means 12".

According to a preferred embodiment of the invention, FIG. 3 shows a separation process of two items to be conveyed 4a, 4b which initially rest together, as in FIG. 2, aligned approximately in parallel to the main conveying direction 6 and on a shared conveying means 12. The entire separation process is shown at different times t (items to be conveyed 4a, 4b), t' (items to be conveyed 4a', 4b') and t" (items to be conveyed 4a", 4b"). The conveying means 12a2 of the first segment 10a leads into the two conveying means 12b2, 12b3 of the second, following segment 10b, so that by transport on the conveying means 12a of the segment 10a the two items to be conveyed 4a, 4b are transferred along the main conveying direction 6 approximately simultaneously onto the segment 10b and the two following conveying means 12b2, 12b3. The item to be conveyed 4b rests singly on the conveying means 12b2 after the transfer, the item to be conveyed 4a rests singly on the conveying means 12b3.

After the transfer, the conveying means 12b2 is now forwarded at the conveying speed 16b along the main transport direction 6, wherein it is either accelerated or transported at a constant transfer rate. The item to be conveyed 4a is delayed on the conveying means 12b3, either by stopping the conveying means 12b3 or operating the same at a lower conveying speed 16a. At time instant t' the item to be conveyed 4b' thus clearly precedes the item to be conveyed 4a'.

Both items to be conveyed 4a', 4b' are now transferred to the conveying means 12c2, wherein the item to be conveyed 4b" already leaves the conveying means 12c2 again when the item to be conveyed 4a" is initially taken over. The items to be conveyed 4a", 4b" are then transferred at the same, but preferably different conveying speeds 16a", 16b" for an even better separation, to the following segment 10d, in turn time offset on different conveying means 12d2, 12d3, which can likewise be activated individually.

According to a preferred embodiment of the invention, FIG. 4 shows a separation process of two items to be conveyed 4a, 4b at different times t, t' and t", which initially rest together with their center of gravity on just one conveying means 12a2 of the conveying system 2 in FIG. 3. The items to be conveyed 4a, 4b are aligned obliquely to the main conveying direction 6, since they rest with their center of gravity mainly on each conveying means 12; a separation can take place analogously to that in FIG. 3. In order to achieve an additional rotation of the items to be conveyed 4a, 4b with the aim of an alignment in parallel with the main conveying direction 6, activation of the directly adjacent conveying means 12, on which the items to be conveyed 4a, 4b rest in each case, which is controlled in terms of time and speed by the control unit 14, must take place in and/or counter to the main conveying direction 6. This requires an adequate adhesion between the item to be conveyed 4 and the supporting and directly adjacent conveying means 12.

The activation of the conveying means 12a2, 12b2, 12b3, 12c2, 12d2, 12d3 takes place substantially analogously to the activation shown in FIG. 3.

Figure 5:
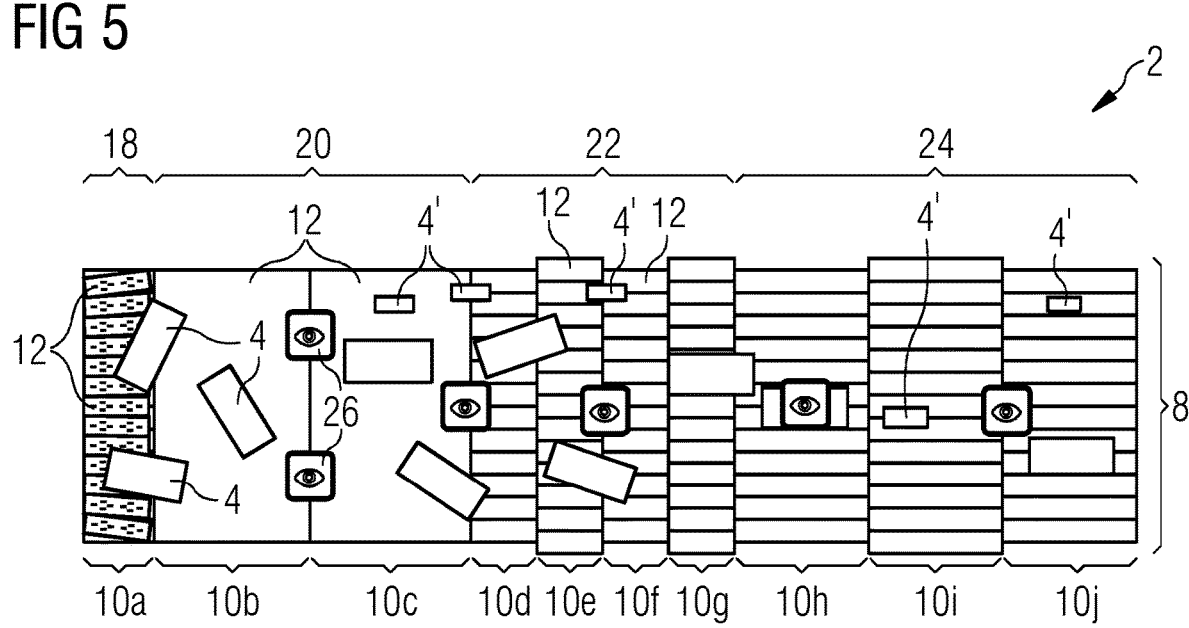
FIG. 5 shows a schematic diagram of an inventive conveying system, which embodies a separation and alignment apparatus.

FIG. 5 shows a schematic diagram of an inventive conveying system 2, which embodies a separation and alignment apparatus. The conveying system 2 is subdivided into segments implementing substantially different tasks along the main conveying direction 6. The items to be conveyed 4, 4' are initially manipulated on a widening apparatus 18 with the aim of achieving as effective a widening of the distribution of the items to be conveyed as possible, by the items to be conveyed 4, 4' being transported along and additionally with a movement component orthogonally to the main conveying direction 6. A single transport along the main conveying direction 6 is then carried out on a transfer conveying means 20. The transfer conveying means 20 comprises two segments 10b, 10c, which each comprise just one single conveying means 12 which spans the entire width of the conveying route 8. The alignment section 22 is used substantially to manipulate the alignment of the items to be conveyed 4, 4' by means of different conveying speeds 16 of the conveying means 12, to this end the segments 10d-10h are relatively short and are arranged offset in relation to one another at right angles to the main conveying direction 6. The distance correction section 24 is configured substantially to achieve as large a distance as possible between the items to be conveyed 4, 4' along the main conveying direction 6, to this end the conveying means 12 of the distance correction section 24 are configured to be longer than those of the alignment section 22.

Items to be conveyed 4, 4' of different sizes are transported on the conveying system 2, wherein the smaller items to be conveyed 4' are so small that two or more items to be conveyed 4' can rest substantially together on just one conveying means 12.

The conveying system 2 comprises a number of sensors 26 which are arranged above and along the conveying route and which are configured as optical detectors. The sensors 26 that are connected to a control unit 14 (cf. FIG. 2) detect the position and alignment of the items to be conveyed 4, 4'. The control unit 14 controls the conveying means 12 in response to the detected position and/or alignment of the items to be conveyed 4. To this end the control unit 14 automatically calculates an optimal activation of the conveying means 12 by means of an algorithm. The algorithm can, but need not, be learnable, preferably iteratively learnable. In order to use as little computing capacity as possible, the algorithm includes in particular the conveying means 12, on which the respective items to be conveyed 4, 4', which are to be separated, currently rest and the directly adjacent conveying means 12, in its calculation of the activation of the conveying means 12. The control unit 14 is adapted in this way to rotate and/or separate an item to be conveyed 4, 4' by controlling the conveying speed 16 of the conveying means 12, in particular the conveying means 12 on which the item to be conveyed 4 rests, and/or the directly adjacent conveying means 12.

The following is a summary list of reference numerals and the corresponding structure used in the above description of the invention:

2 Conveying system
4 Item to be conveyed

6 Main conveying direction
8 Conveying route
10 Segment
12 Conveyors, conveying means
14 Control unit
16 Conveying speed
18 Widening apparatus
20 conveying means
22 Alignment section
24 Distance correction section
26 Sensor

The invention claimed is:

1. A conveying system for transporting items to be conveyed along a main conveying direction, the conveying system comprising:
    a control unit;
    a conveying route formed of a plurality of at least four segments;
    each of said segments including a plurality of conveyors arranged in parallel with one another and adjacent one another in a transverse direction perpendicular to the main conveying direction, each of said conveyors extending in the main conveying direction and being configured to transport the items to be conveyed along the main conveying direction;
    said segments being arranged one behind another along the main conveying direction and said conveyors of adjacent said segments being laterally offset relative to one another perpendicularly to the main conveying direction;
    said segments having an equal width in the transverse direction and different lengths in the main conveying direction;
    said conveyors of a preceding segment and of a directly following segment being laterally offset relative to one another, and a respective said conveyor of a preceding segment being aligned to lead into two or more said conveyors of a following segment; and
    said conveyors being connected to said control unit and individually driven and individually activated by said control unit.

2. The conveying system according to claim 1, wherein said conveyors comprise conveyor belts and the system is configured for transporting postal items.

3. The conveying system according to claim 1, wherein one or more segments comprise similar conveyors.

4. The conveying system according to claim 1, which further comprises at least one sensor configured to detect at least one of a position or an alignment of the items to be conveyed and wherein said control unit is configured to activate said conveyors in response to a detected position and/or alignment of the items to be conveyed.

5. The conveying system according to claim 1, wherein said control unit is configured to rotate and/or singulate items to be conveyed by controlling a conveying speed of said conveyors.

6. The conveying system according to claim 5, wherein said control unit is configured to selectively control the conveying speed of said conveyors on which the item to be conveyed rests and/or directly adjacent said conveyors.

7. A method for transporting items to be conveyed along a conveying route of a conveying system, wherein:
    the conveying route is formed of at least four segments that are arranged one behind another along a main conveying direction, the segments having an equal width in a transverse direction perpendicular to the main conveying direction and different lengths in the main conveying direction;
    each of the segments having a plurality of mutually parallel conveyors adjacent one another in the transverse direction perpendicular to the main conveying direction, each of the conveyors extending in the main conveying direction and being configured to transport the items to be conveyed along the main conveying direction; and
    the conveyors of a following segment are laterally offset relative to the conveyors of a preceding segment, and a respective conveyor of a preceding segment is aligned to lead into two or more conveyors of a following segment;
    the method comprising:
    individually driving and activating the conveyors; and
    transporting an item to be conveyed on a preceding segment;
    transferring the item to be conveyed along the main conveying direction from one or more conveyors of the preceding segment to one or more conveyors of a following segment that are offset in the transverse direction relative to the conveyors of the preceding segment; and
    monitoring a position and/or an alignment of the item being conveyed along the main conveying direction with at least one sensor disposed along the conveying route and individually adjusting the conveyors to selectively correct the position or alignment of the item while transporting the item to be conveyed on the following segment.

8. The method according to claim 7, which comprises transporting postal items along conveyors in the form of conveyor belts.

9. The method according to claim 7, wherein the conveyors of mutually adjacent segments are arranged such that an item to be conveyed is transferred from one conveyor of the preceding segment to two conveyors of the following segment.

10. The method according to claim 7, which comprises detecting a position and/or alignment of the items to be conveyed on the conveying system and activating the conveyors in response to the detected position and/or alignment of the items to be conveyed.

11. The method according to claim 7, which comprises rotating and/or separating the items to be conveyed by controlling a conveying speed of the conveyors.

12. The method according to claim 11, which comprises controlling the conveying speed of the conveyors on which the items to be conveyed rest, and/or the directly adjacent conveyors.

13. The method according to claim 7, which comprises transferring the items from one preceding segment to a following segment by involving two or more conveyors.

* * * * *